(12) United States Patent
Liu

(10) Patent No.: US 10,967,529 B2
(45) Date of Patent: Apr. 6, 2021

(54) DUAL SCISSOR WITH LIFTER

(71) Applicant: Calvin T. Liu, Dunwoody, GA (US)

(72) Inventor: Calvin T. Liu, Dunwoody, GA (US)

( * ) Notice: Subject to any disclaimer, the term of this patent is extended or adjusted under 35 U.S.C. 154(b) by 0 days.

(21) Appl. No.: 16/401,076

(22) Filed: May 1, 2019

(65) Prior Publication Data
US 2019/0337170 A1    Nov. 7, 2019

Related U.S. Application Data

(60) Provisional application No. 62/668,220, filed on May 7, 2018.

(51) Int. Cl.
*B26B 13/22* (2006.01)
*A21C 15/04* (2006.01)

(52) U.S. Cl.
CPC .............. *B26B 13/22* (2013.01); *A21C 15/04* (2013.01)

(58) Field of Classification Search
CPC ................................ B26B 13/22; A21C 15/04
USPC .......... 30/114–117, 226, 227, 231, 233, 235, 30/257, 312; D7/693; D8/56–58
See application file for complete search history.

(56) References Cited

U.S. PATENT DOCUMENTS

| | | | | | |
|---|---|---|---|---|---|
| 417,366 | A | * | 12/1889 | Phippen et al. ........ | B26B 13/22 30/131 |
| 550,483 | A | * | 11/1895 | Carrier .................... | A22C 9/008 30/226 |
| 703,253 | A | * | 6/1902 | Hamilton ................ | B26B 15/00 30/231 |
| 1,012,918 | A | * | 12/1911 | Roelants et al. ...... | B23D 29/023 30/227 |
| 1,020,865 | A | * | 3/1912 | Wieber .................... | B26D 3/24 30/114 |
| 1,251,101 | A | * | 12/1917 | Quigley .................. | B26B 29/04 30/233 |
| 1,345,882 | A | * | 7/1920 | Repass .................... | B26B 13/00 30/233 |
| 1,489,176 | A | * | 4/1924 | Van Hall et al. ...... | D05B 37/02 30/226 |
| 1,600,225 | A | * | 9/1926 | Halpern ............. | A61B 17/3201 30/233 |
| 2,832,987 | A | * | 5/1958 | Di Camillo .......... | A22C 29/024 30/233 |
| 2,840,905 | A | * | 7/1958 | Geiger ................. | B23D 29/026 30/226 |

(Continued)

FOREIGN PATENT DOCUMENTS

| | | | | | |
|---|---|---|---|---|---|
| DE | 9302566 | U1 | * | 8/1993 | ............. B26B 13/22 |
| DE | 4308212 | A1 | * | 9/1994 | ............. A21C 15/04 |

(Continued)

*Primary Examiner* — Jason Daniel Prone
(74) *Attorney, Agent, or Firm* — John L. Doughty; Doughty Law, L.L.C.

(57) ABSTRACT

A dual scissor with lifter device for cutting out a pizza slice and lifting the pizza slice is provided herein. The dual scissor with lifter can comprise several parts. It can comprise a first scissor, a second scissor, and a lifter piece 115. The first scissor and the second scissor can be attached to the lifter piece. The first scissor and the second scissor can be used to cut out, for example, a slice of pizza (or pie, cheesecake, pastries, breads, and other flat-like circular foods), from the whole pizza. The lifter piece can be used to support and lift the slice of pizza after the slice has been cut by the first scissor and the second scissor.

3 Claims, 3 Drawing Sheets

(56) References Cited

U.S. PATENT DOCUMENTS

| | | | | |
|---|---|---|---|---|
| 3,010,206 A | * | 11/1961 | Curry | B23D 29/023 30/131 |
| 3,078,503 A | * | 2/1963 | Webb | A22C 21/063 30/233 |
| 3,711,945 A | * | 1/1973 | Cronheim | A47G 21/045 30/142 |
| 3,877,145 A | * | 4/1975 | Andrews | A61B 17/3201 30/231 |
| 4,227,305 A | * | 10/1980 | Newman | B26B 13/10 30/233 |
| 4,592,139 A | * | 6/1986 | Huang | A47G 21/045 30/114 |
| 5,035,054 A | * | 7/1991 | Ellenberger | B26B 13/22 30/233 |
| 5,469,622 A | * | 11/1995 | Gradoni | B26B 13/22 30/114 |
| 5,600,891 A | * | 2/1997 | Orgal | B26B 13/00 30/226 |
| 5,903,981 A | * | 5/1999 | Grow, II | A47G 21/045 30/114 |
| 5,996,592 A | * | 12/1999 | Choy | B26B 13/24 30/226 |
| 6,145,203 A | * | 11/2000 | Appleman | B23D 29/02 30/233 |
| 6,381,851 B1 | * | 5/2002 | Meyer | A21C 15/04 30/114 |
| 6,434,832 B1 | * | 8/2002 | Garrett | B26B 13/24 30/226 |
| 6,453,560 B1 | * | 9/2002 | Silver | B26B 13/00 30/258 |
| 6,513,247 B1 | * | 2/2003 | Krasik-Geiger | B26B 13/22 30/233 |
| D483,627 S | * | 12/2003 | Ronan | D7/693 |
| D483,628 S | * | 12/2003 | Smith | D7/693 |
| D488,963 S | * | 4/2004 | Silver | D7/693 |
| 7,032,316 B1 | * | 4/2006 | Tseng | B26B 13/10 30/226 |
| D544,765 S | * | 6/2007 | Peterson | D7/693 |
| 7,913,396 B2 | * | 3/2011 | Wei | A21C 15/04 30/114 |
| 8,887,400 B2 | * | 11/2014 | Greer | B26B 13/06 30/233 |
| 9,936,633 B2 | * | 4/2018 | Roberts | A01D 1/00 |
| 10,085,456 B2 | * | 10/2018 | Avila Macias | A21C 15/04 |
| 2007/0245566 A1 | * | 10/2007 | Akopyan | A21C 15/04 30/114 |
| 2008/0134517 A1 | * | 6/2008 | Bosworth | A21C 15/04 30/114 |
| 2009/0193660 A1 | * | 8/2009 | Chen | A21C 15/04 30/114 |

FOREIGN PATENT DOCUMENTS

| | | | | |
|---|---|---|---|---|
| DE | 29618143 U1 | * | 2/1997 | A21C 15/04 |
| FR | 729238 A | * | 7/1932 | B26B 13/22 |
| GB | 141158 A | * | 4/1920 | B26B 13/22 |

* cited by examiner

DUAL SCISSOR WITH LIFTER

TECHNICAL FIELD

This invention, as described in example embodiments, relates to a kitchen utensil, specifically a device that can be used to cut slices of a pizza or other foot item, and lift it for serving.

BACKGROUND

Currently, when people eat pizza, they cut a whole pizza into wedged-shaped slices with a knife, or a rolling pizza slicer (e.g., a round, rolling utensil with sharp edges), or the side of a pizza spatula. The rolling pizza slicer can be dull, requiring the user to roll the slicer many times. The pizza spatula's edges are not intended to be used as a knife, and are not sharp.

After cutting the pizza into a slice, a user must put the cutter down, and then use a pizza spatula to pick it up. Strands of cheese can spill over the edge of the pizza slice, forcing the user to lift the pizza slice high enough so that the strands of cheese snap, or, alternatively, the user must have someone else cut or snap the additional strands of cheese (usually with a knife, scissors, or even their hands). This can be very inefficient, and messy.

BRIEF DESCRIPTION OF THE DRAWINGS

Like reference numbers and designations in the various drawings indicate like elements.

DETAILED DESCRIPTION

Figure 1:
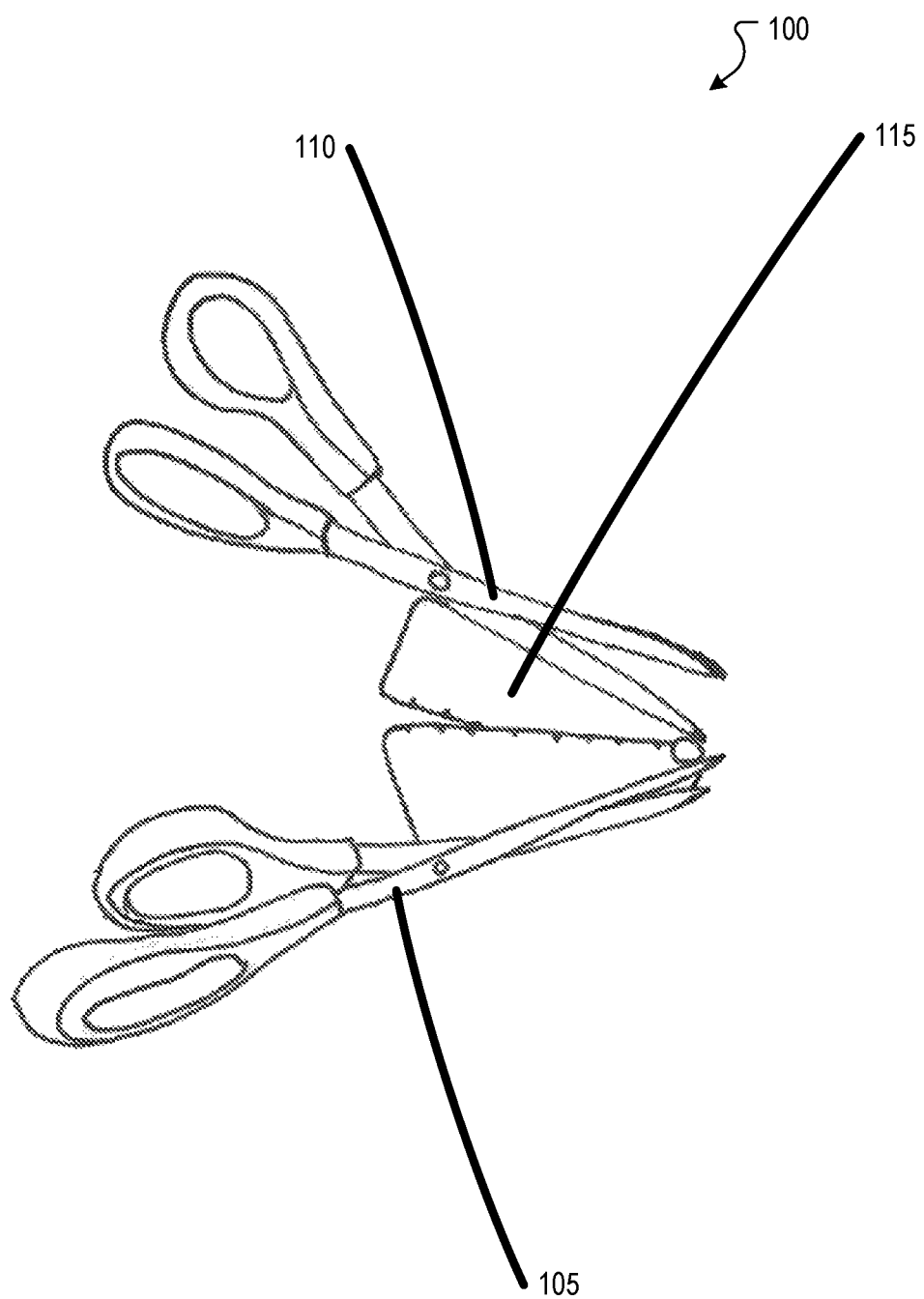
FIG. 1 is an image of an example embodiment of the dual scissor with lifter, in accordance with example embodiments of the present invention.

FIG. 1 is an image of an example embodiment of the dual scissor with lifter 100, in accordance with example embodiments of the present invention.

The dual scissor with lifter 100 can comprise several parts. It can comprise a first scissor 105, a second scissor 110, and a lifter piece 115. The first scissor 105 (which can be a right-handed scissor) and the second scissor 110 (which can be a left-handed scissor) can be attached to the lifter piece 115. The first scissor 105 and the second scissor 110 can be used to cut out, for example, a slice of pizza (or pie, cheesecake, pastries, breads, and other flat-like circular foods), from the whole. The lifter piece 115 can be used to support and lift the slice of pizza after the slice has been cut by the first scissor 105 and the second scissor 115. A method of using the dual scissor with lifter 100 device is described further below.

Figure 2:
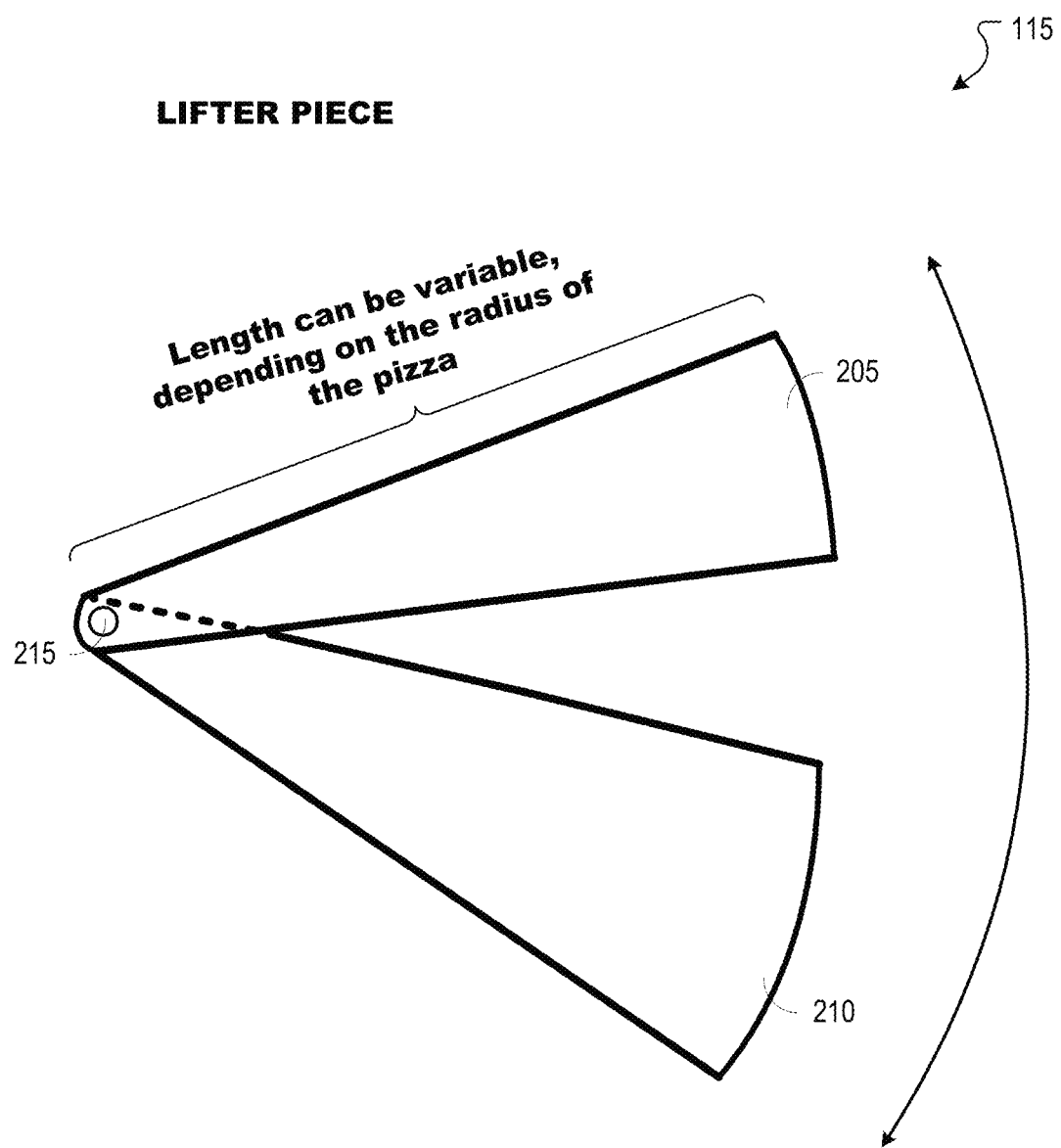
FIG. 2 is a diagram of the center piece of the dual scissor with lifter, in accordance with example embodiments of the present invention.

The lifter piece 100, as shown in FIG. 2, can comprise a first flat piece 205, and a second flat piece 210. Each flat piece can be wedge-shaped, resembling a triangular spatula without a handle. Each flat piece can be made of metal (e.g., stainless steel), or a plastic material. The thickness of each flat piece can vary from thinner to thicker. Naturally, the thickness of each flat piece, and the materials which comprise it, can impact the quality, durability, and stability of each flat piece. The length of each flat piece can be manufactured to vary, according to the dimension of a food item (for example, for a pizza with a 6 inch radius, the length of each flat piece can be manufactured to be approximately 6 inches).

The front portion of each of the two flat pieces can be (but doesn't need to be) connected by a connector 215. The connector 215 can be any kind of connector that can allow the two flat pieces to pivot about the connector 215. The connector 215 can be, for example, a pin, a screw, wire, etc.

The first scissor 105 can be attached to the first flat piece 205 at or near the edge of the first flat piece 205 and at or near the edge of the bottom blade of the first scissor 105. The second scissor 110 can be attached to the second flat piece 210 at or near the edge of the second flat piece 210 and at or near the edge of the bottom blade of the second scissor 110.

Figure 3:
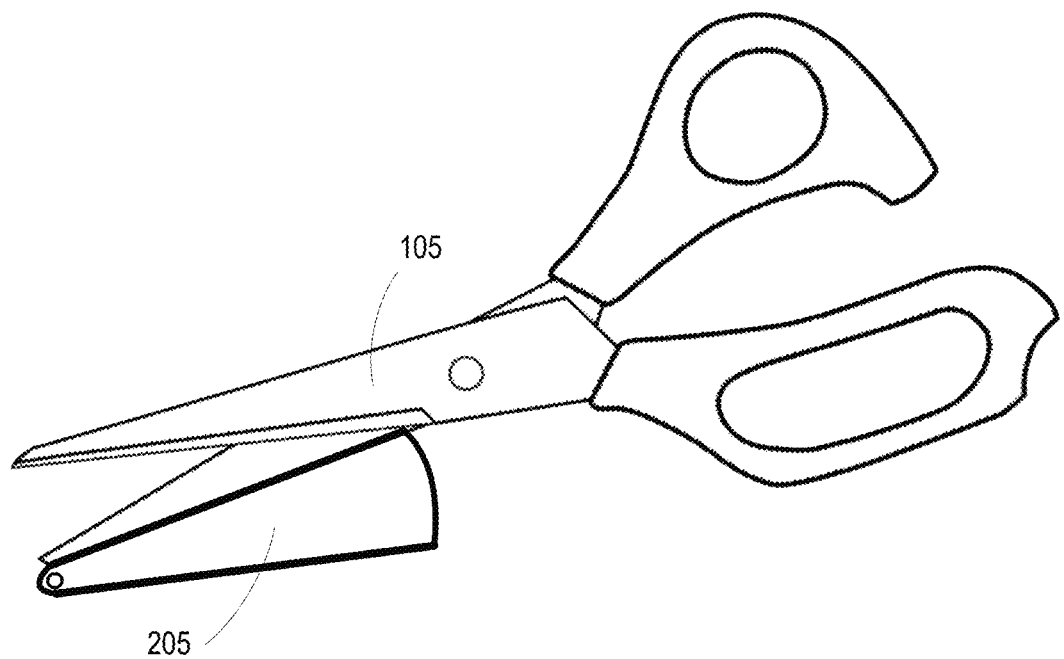
FIG. 3 is an illustration of one side of the dual scissor with lifter, which provides a view that facilitates understanding of example embodiments of the present invention.

In example embodiments, the flat pieces can be attached to the scissors at approximately a 90 degree angle. By way of illustration, FIG. 3 shows one of the scissors (e.g., first scissor 105) and one of the pieces (e.g., first flat piece 205). Each flat piece can be attached using a variety of methods, including any method known to those of ordinary skill (e.g., welded, 90 degree brackets, adhesives, screws, etc.).

In some example embodiments, the flat pieces can have L or T shaped groves along the length of the edge that connects to the scissor, and the bottom blade of each scissor can have a groove (or protruding portion) along its length. Each blade can attach to each flat piece by sliding into each flat piece where the grooves/protrusions are. In such embodiments, the dual scissor with lifter 115 can easily be detached from the scissors, providing ease of storage and also allowing for the separate cleaning of the scissors and the lifter piece 115.

In other example embodiments, the bottom blade of the scissor can be integrated with the bottom blade and flat piece during manufacturing, such that the bottom blade of the scissor and the flat piece is a single member.

The scissor's length can correspond to the length of each flat piece (e.g., a 6 inch flat piece can be attached to a scissor having a 6 inch blades, where each blade, when attached, meets at or near the pivot point where the connector 215 is).

Operationally a user of the dual scissor with lifter 100 take each scissor by the handles, one in each hand. The user can open up the scissor, and adjust the width of the lifter piece 115 to the size of the pizza that the user would like to each. The lifter piece 155 expands and contracts by moving about the pivot point where the connector 215 is. The user slides the bottom blades of the scissors and the lifter piece 115 below the pizza. The user then cuts the piece into a slice, which is held by the lifter piece 115. The user can then lift the pizza and place it onto his or her place (for example, by opening up the lifter piece 115).

Example embodiments of the invention have been described in this specification. Other embodiments can be within the scope of the following claims.

What is claimed is:

1. A device for cutting food, comprising:
   a first scissor that comprises a first blade and second blade;
   a second scissor that comprises a first blade and second blade; and
   a lifter comprising a first flat piece and a second flat piece, wherein the first flat piece is connected to the first blade of the first scissor, and the second flat piece is connected to the first blade of the second scissor; and wherein the first flat piece and the second flat piece are each shaped as a wedge; and wherein the second flat piece is connected to the first flat piece.

2. The device of claim 1, wherein the first flat piece and the second flat piece are connected at a connection between the first flat piece and the second flat, wherein the connection is defined by a connector.

3. A method cutting pizza with a device:
that includes:
- a first scissor that comprises a first blade and second blade;
- a second scissor that comprises a first blade and second blade; and
- a lifter comprising a first flat piece and a second flat piece, wherein the first flat piece is connected to the first blade of the first scissor, and the second flat piece is connected to the first blade of the second scissor; and wherein the first flat piece and the second flat piece are each shaped as a wedge; and wherein the second flat piece is connected to the first flat piece;

placing the first and second flat pieces, and the first blades of the first and second scissors correspondingly connected thereto, against a first side of the pizza;

placing the second blades of the first and second scissors against a second side of the pizza; and operating the device by closing the first and second blades thereof to cut the pizza into a wedge-shaped piece of the pizza with the first blades and the second blades of the first and second scissors.

\* \* \* \* \*